United States Patent [19]

Blanpied

[11] Patent Number: 4,559,370

[45] Date of Patent: * Dec. 17, 1985

[54] COPOLYESTER POLYOL RESINS, POLYOL BLENDS COMPRISING THE SAME, AND RESULTANT POLYISOCYANURATE FOAMS

[76] Inventor: Robert H. Blanpied, 10122 Cherry Tree Dr., Dallas, Tex. 75243

[*] Notice: The portion of the term of this patent subsequent to Aug. 23, 2000 has been disclaimed.

[21] Appl. No.: 614,041

[22] Filed: May 25, 1984

[51] Int. Cl.$^4$ .............................................. C08G 18/14
[52] U.S. Cl. .................................... 521/112; 521/110; 521/125; 521/129; 521/172; 521/48.5; 528/220; 528/296; 528/302; 528/320; 560/90
[58] Field of Search .................... 521/172, 48.5, 110, 521/112, 125, 129; 528/220, 296, 302, 320; 560/90

[56] References Cited

U.S. PATENT DOCUMENTS

| | | |
|---|---|---|
| 3,257,335 | 6/1966 | Whitfield, Jr. et al. ............ 521/48.5 |
| 3,647,759 | 3/1972 | Walker ................................. 528/296 |
| 3,857,799 | 1/1975 | Ooba et al. ............................. 521/40 |
| 3,884,850 | 5/1975 | Ostrowski ........................... 521/48.5 |
| 3,907,868 | 9/1975 | Currie et al. ........................... 560/98 |
| 4,048,104 | 10/1977 | Svoboda et al. ..................... 521/159 |
| 4,223,068 | 9/1980 | Carlstrom et al. ................ 428/304.4 |
| 4,246,365 | 1/1981 | Wiedermann et al. ............. 521/172 |
| 4,400,477 | 8/1983 | Blanpied ............................. 521/112 |
| 4,417,001 | 11/1983 | Svoboda et al. ..................... 521/114 |

Primary Examiner—Maurice J. Welsh
Attorney, Agent, or Firm—Sigalos & Levine

[57] ABSTRACT

Copolyester polyol resins comprising the reaction product of an aromatic component selected from phthalic derivatives, polyethylene terephthalate, or dimethyl terephthalate, an aliphatic component selected from certain dibasic compounds, at least one primary hydroxyl glycol, and at least small amounts of a secondary hydroxyl glycol, the mole ratios of the components being:

(a) glycols to aromatic plus aliphatic component of from about 1.3 to 2:1;
(b) aromatic component to aliphatic component of from about 0.6 to 4.0:1;
(c) a secondary to primary hydroxyl glycol of from 0.05 to 0.4:1; and
(d) ethylene glycol content to aromatic component of from about 0.01 to 0.5:1.0.

The invention also comprises polyol blends utilizing from 30 percent up to 90 percent of such resins and resultant polyurethane modified polyisocyanurate foams made by reacting such polyol blends with polymeric polymethylene polyphenylisocyanate. Also disclosed is a method to digest polyethylene terephthalate waste and remove a majority of the ethylene glycol formed during digestion.

16 Claims, No Drawings

COPOLYESTER POLYOL RESINS, POLYOL BLENDS COMPRISING THE SAME, AND RESULTANT POLYISOCYANURATE FOAMS

BACKGROUND OF THE INVENTION

The present invention relates to certain polyester polyols suitable for blending with propoxylated polyether polyols or other materials mutually compatible with foam blowing agents and polyester polyols to achieve polyisocyanurate foams of excellent dimensional strength and acceptable levels of fire resistance, and a method for making them.

The use of polyester polyols to prepare urethane foams is an old and well-known procedure. Over the years many inventions have been made to improve the resultant products in terms of lower costs, lower viscosity to permit ready handling in conventional urethane mixing and pumping systems, better dimensional strength of the foam, increased fire retardancy of the foam, and many other properties.

Many attempts have been made to use polyester polyols, such as the Hercules "Terate" products, in a blend with propoxylated polyether polyols to achieve the ASTM E 84 Class 2 fire resistance rating without fire retardants, or the Class 1 fire resistance rating upon addition of fire retardants such as tri(B-chloroisopropyl) phosphate. Other polyester/polyether polyol blends have been attempted to commercially utilize polyester polyol products, but have suffered from problems such as a high viscosity which hinders mixing, inadequate fire resistance due to the presence of a high hydrogen content, a polyol B blend which separates or contains solids such that settling and storage tank build-up and strainer plugging problems occur, a high hydroxyl number such that sufficient trimerized polyisocyanurate stabilizing rings cannot be formed without using large proportions of polymeric polymethylene polyphenyl isocyanate (PMDI) and thus substantially increasing the total cost, or the cost of the polyester polyol is too high to be of commercial value.

In an effort to reduce costs, many attempts have been made to use "bottoms" or "side streams" from major processes, and also to re-use plastic waste or scrap. For example, U.S. Pat. No. 3,647,759 teaches the use of side streams from a DMT production process as a source of aromatic core units for polyester polyols going into polyurethane foams. Also, the reduction by alcoholysis and glycolysis of high molecular weight polyethylene terephthalate plastic waste or scrap into low molecular weight oligimers is an old and wellknown art, as set forth as early as 1966 by H. B. Whitfield, Jr., et al. in U.S. Pat. No. 3,257,335 (now expired), plus several others, including Ooba, et al. (U.S. Pat. No. 3,857,799), H. S. Ostrowski (U.S. Pat. No. 3,884,850), Currie (U.S. Pat. No. 3,907,868), and Svoboda (U.S. Pat. No. 4,048,104), all of whom teach using diols to digest PET. The prior art does not teach making a diol oligimer from PET by substituting a majority of the ethylene glycol produced in PET digestion with a higher boiling point diol. It has been found that if no ethylene glycol is removed, thus leaving equal molar amounts of phthalate core units to ethylene glycol units, a copolyester polyol cannot be made which has a sufficiently low level of all three (3) of the following properties concurrently:

(1) A low enough hydroxyl number to produce a PIR foam with a -NCO to -OH ratio high enough to make a stable foam and still reduce PMDI costs; and (2) A viscosity low enough to provide good mixing, good spreading, and good handling operability; and (3) A hydrogen content low enough to provide sufficient fire resistance to achieve Class 1 and more severe fire tests.

For example, with some low molecular weight polyols which have an adequate low viscosity, it has been found that they oftentimes have a high hydrogen content which produces poor fire retardancy or a hydroxyl number so high as to require a large proportion of isocyanate to form a suitable foam, thereby greatly adding to cost. Because of a low proportion of polyol, the blowing agent; such as CFC-11 must be blended into the isocyanate into an "A" blend portion as it is conventionally called. This imbalance precludes the use of normal urethane mixing equipment and creates mixing problems.

Efforts to use polyester polyols which are predominantly diols to make urethane foams lacking isocyanurate linkages have been restricted by the low levels of diol which can be tolerated. For example, in U.S. Pat. No. 4,223,068, a maximum of 30 weight percent diol could be used in a mixture with higher functionality polyols to form a polyurethane foam. The fire resistance and dimensional stability in this patented foam were not obtained from trimerized polyisocyanurate. Further, the polyurethane foam prepared does not necessarily require a secondary glycol or an aliphatic core component. U.S. Pat. No. 4,417,001 discloses the use of a secondary hydroxyl glycol, dipropylene glycol (DPG), in order to introduce blowing agent miscibility. In addition to adding compatibility, DPG also adds equivalent weight which reduces the hydroxyl number. Together these properties make it possible to use a higher percentage of the copolyester polyol in a B blend formulation; however, this copolyester polyol has a hydrogen content so high it cannot be used in large quantities alone to achieve a Class 2 foam or with fire retardants to achieve Class 1. Thus, we see that the failure to remove a majority of the ethylene glycol content produced by the disassociation (digestion) of PET has required a large amount of secondary glycol to compensate for the negative effects of ethylene glycol, and has been detrimental to this polyol. The polyol of the present invention requires that at least 50% of the ethylene glycol produced in the digestion of PET be removed prior to use, and, further, that a minimum of secondary hydroxyl glycols be present and also that aliphatic acid core components must be used, as well as primary hydroxyl glycols and an aromatic core unit. These requirements provide the polyol with a low enough hydroxyl number and enough blowing agent miscibility such that up to 90% (by weight) of a polyol blend can be the polyester which in turn provides the highly trimerized polyisocyanurate foam with good dimensional stability and fire resistance.

In U.S. Pat. No. 4,400,477 polyester polyols are disclosed which eliminate some of these previous problems, such as the need to add fire retardants to achieve ASTM E 84 Class 1 flame spread rating. Also, these polyols do not require additional materials in order to obtain complete CFC-11 miscibility. However, these polyols are not entirely satisfactory for all types of applications. For example, these polyols have a limited range of reaction speeds when reacting with PMDI. Many foam applications require that reaction speeds be much slower or faster than can be achieved with these polyols. Also, no provision was made for a polyol blend (or B blend) containing higher functionality groups, which omission correlates to a lack of "green strength", thus requiring careful handling in the demolding process. Many foam applications require that products be demolded quickly. Further, many foam applications do not require the Class 1 flame spread rating of these polyols. For example, some insulation used in the construction industry may only require a moderate level of fire resistance with a flame spread between 25 and 75.

Thus, while some success has been encountered in one or more of the desired properties, it has not been possible to have polyol blends with the requisite low viscosity, a low percent hydrogen content for good flame resistance, a moderate level of CFC-11 miscibility, a high degree of early green strength whereby products are more easily demolded, a low enough hydroxyl number to allow for adequate formation of polyisocyanurate rings at moderate levels of PMDI addition, and the capability of a broad range of reaction speeds when reacting with PMDI.

SUMMARY OF THE INVENTION

The present invention overcomes the problems of the prior art and provides a class of novel copolyester polyols suitable for blending with propoxylated polyether polyols having a functionality greater than two or other materials mutually compatible with conventional blowing agents such as CFC-11 and polyester polyols in order to form polyisocyanurate foams.

The polyols of the present invention provide a unique combination of desirable characteristics when thus used in a blend with appropriate polyether polyols, such as moderate fire resistance, low viscosity, good compatibility with CFC-11 and polyether polyols, a low hydroxyl number, no discernable solids content, low cost, and the capability of a broad range of reaction speeds when reacting with PMDI.

Briefly, the present invention comprises a hydroxyl terminated copolyester polyol resin comprising the reaction product of:

1. an aromatic component selected from phthalic anhydride; phthalic acid isomers; phthalic acid halide isomers; di-lower alkanol esters of phthalic acid isomers; digestion products of polyethylene terephthalate; or mixtures thereof; and
2. at least one aliphatic component selected from succinic anhydride; succinic, glutaric, or adipic acids; di-lower alkanol esters of succinic, glutaric, or adipic acids; acid halides of succinic, glutaric or adipic acids; or mixtures thereof; and
3. at least one primary hydroxyl glycol; and
4. at least one secondary hydroxyl glycol; the mole ratios of the components being:
   (a) glycols to aromatic plus aliphatic component of from about 1.3 to 2:1,
   (b) aromatic component to aliphatic component of from about 0.6 to 4.0:1,
   (c) a secondary to primary hydroxyl glycol of from 0.05 to 0.4:1, where all mole ratios represent the final mole ratios inasmuch as glycols may be removed during processing, and
   (d) ethylene glycol content to aromatic component of from about 0.01 to 0.5:1.0, when a digestion product of polyethylene terephthalate is used to supply the aromatic component.

The invention also comprises a polyol blend comprising:
   A. from about 30 percent up to about 90 percent by weight of the above hydroxyl terminated copolyester polyol resin, and
   B. from about 10 percent up to about 70 percent by weight of any materials or blends of materials which are mutually compatible with blowing agents and said polyester polyols, wherein the final blend will provide sufficient urethane cross-linking functionalities or allow isocyanate trimerization to produce dimensionally stable foams.

Further, the invention comprises a polyurethane modified polyisocyanurate low density foam comprising the reaction product of:
   (a) polymeric polymethylene polyphenyl isocyanate;
   (b) the polyol blend prepared as above;
   (c) catalysts suitable for preparing a polyurethane and a polyisocyanurate foam;
   (d) a blowing agent suitable for preparing a polyurethane modified polyisocyanurate low density foam; and, optionally,
   (e) a silicone surfactant suitable for controlling foam cell size and shape.

Additionally, the polyurethane modified polyisocyanurate low density foam has a density between 0.5 and 10.0 pounds per cubic foot, and is most preferably between 1.0 and 5.0 pounds per cubic foot.

The invention also comprises the method of making the hydroxyl terminated copolyester polyol resin utilizing a digestion product of polyethylene terephalate having the majority of the ethylene glycol formed during digestion removed therefrom, said digested polyethylene terephthalate, and the method of making such digestion products as set forth below.

DETAILED DESCRIPTION

The hydroxyl terminated copolyester polyol resin of the present invention is prepared from both an aromatic and aliphatic dicarboxylic acid component, at least one primary hydroxyl glycol component, and at least one secondary hydroxyl glycol component.

This polyol resin preferentially has a functionality of about 2. It may be slightly less than 2 depending on the presence of methoxyl groups.

The aromatic dicarboxylic acid component can be selected from difunctional ester-forming derivatives, such as di-lower alkanol phthalic acid ester isomers, phthalic acid halide isomers, phthalic anhydride, phthalic acid isomers, digestion products of polyethylene terephthalate plastic, or mixtures thereof.

Preferably, the aromatic component is selected from phthalic anhydride, dimethyl terephthalate, or the terephthalic core units found in digested polyethylene terephthalate.

Most preferable is the aromatic component found in the digestion product of polyethylene terephthalate plastic wherein over 50% of the ethylene glycol has been removed prior to use.

The aliphatic dicarboxylic acid component can be selected from difunctional ester-forming derivatives such as succinic anhydride; succinic, glutaric, or adipic acids; the di-lower alkanol esters of these acids; the acid halides of these acids; or mixtures thereof. The aliphatic component can also be a blend of the acids; the di-lower alkanol esters of succinic, glutaric, and adipic acid. Preferably, the aliphatic component has a chain length of 2, 3, or 4 carbons between the two carboxyl groups.

Chain lengths of six carbons or more between the two carboxyl groups are not desirable in amounts specified in the present invention because the hydrogen content is too high to provide for adequate fire resistance, although compounds of this type can be present in small amounts without affecting the properties of the present invention in any appreciable degree.

The primary hydroxyl glycols preferably contain from 2 to 10 carbon atoms. Representative examples are ethylene glycol, diethylene glycol, triethylene glycol, tetraethylene glycol, pentaethylene glycol, and polyethylene glycol 200, or mixtures thereof. Additionally, the ethylene glycol found in digestion products of polyethylene terephthalate can be utilized. Other primary glycols without ether linkages, such as 1,4 butanediol and 1,6 hexanediol can be utilized in the present invention, but are not preferred due to the high cost. Primary glycols with more than ten carbon atoms are not desirable because the long carbon chains raise the percentage of hydrogen content and thus reduce fire resistance, although compounds of this type can be present in small amounts without affecting the properties of the present invention in any appreciable degree.

Additionally, at least small amounts of a secondary hydroxyl glycol must be present. Representative examples are propylene glycol, dipropylene glycol, tripropylene glycol, or mixtures thereof. Generally, secondary glycols are more costly than primary hydroxyls, and if possible it is desirable to reduce the need for secondary glycols. The degree to which a secondary hydroxyl glycol is required in the present invention depends on the composition of the propoxylated polyether polyol to be blended with the copolyester. If no secondary hydroxyl glycol is used in a polyester polyol, the lack of CFC-11 compatibility will severely restrict its level of use, thus defeating one of the objects of the invention. Enough polyester diol must be usable, as a weight percentage of total polyol blend used, to keep the hydroxyl number low without sacrificing hydrogen content, compatibility, and functionality. Secondary glycols having more than 9 carbon atoms are not desirable in amounts specified in the present invention because of the large percentage of hydrogen content, although compounds of this type can be present in small amounts, without affecting the properties of the present invention in any appreciable degree.

The miscibility of CFC-11 is also affected by the relative polarity of the copolyester polyol and of the total blend. In general, increased frequency of the carboxyl units lead to increased polarity of the copolyester polyol. The polarity of the polyether polyol to be used in the polyol blend will also affect the CFC-11 miscibility. Advantageously, the glycol chain lengths and the ratio of secondary to primary glycols can be adjusted to meet the needs of a wide variety of commercial applications of polyether polyols.

The ratio of secondary to primary glycols is also important in determining the total reaction speed desired for a particular foam application. Since primary hydroxyl terminated polyols react with PMDI much faster than secondary polyols, a low ratio of secondary to primary glycols is advantageous in applications requiring a fast reaction speed. Thus, both reaction speeds and CFC-11 miscibility can be adjusted by using a favorable ratio of secondary glycols to primary glycols.

Glycols other than propylene glycol which have both primary and secondary hydroxyls, such as 1,3 butylene glycol can be used, but are not preferred due to their higher cost and lack of any significant advantage to using a glycol with special orientation.

From 30 percent up to 90 percent by weight of the polyester polyol of the present invention can be blended with from 10 percent up to 70 percent by weight of a predominantly propoxylated polyether polyol, or mixtures thereof with a surfactant, or a fire retardant, or any similar material mutually compatible with CFC-11 and the claimed polyester polyols, or mixtures thereof. Polyether polyols which have been produced mainly with ethylene oxide are not desirable in blends with polyols of the present invention. The polyether polyol blended with the instant copolyester polyol must have a majority of the ether linkages supplied by propylene oxide rather than ethylene oxide. One skilled in the art will recognize the need to make a blend. Which either will have sufficient urethane cross-linking functionalities or else will allow sufficient isocyanate trimerization to obtain dimensionally stable foam. Certain fire retardants such as tri(B-chloroisopropyl) phosphate, and non-ionic surfactants such as the ethoxylated octyl and nonyl phenols, or mixtures thereof, can provide adequate CFC-11 compatibility when used in amounts totalling about 10 to 15 weight percent of selected blends which contain the higher levels of secondary glycols.

A major advantage provided by the polyols of the present invention is due to their high equivalent weight together with low viscosities. Typically, these polyols have hydroxyl numbers between 200 and 250 (from 224 to 281 equivalent weight) with a Brookfield viscosity of from 4000 to 10,000 cps at 25° C. Prior art has indicated both hydroxyl numbers above 300 (equivalent weight below 187) plus a Brookfield viscosity of over 15,000 cps at 25° C. Other prior art with hydroxyl numbers below 300 and viscosities below 10,000 cps at 25° C. have indicated either a relatively high percentage of primary hydroxyl units causing CFC-11 incompatibility or else a relatively high hydrogen content and thus do not provide the necessary fire resistance. One skilled in the art of polyisocyanurate foam formation recognizes that polyol blend viscosities over 10,000 cps can cause several problems. Also, a much higher weight ratio of PMDI is required to make a mechanically stable polyisocyanurate foam when the polyol has a high hydroxyl number (or low equivalent weight).

In a preferred embodiment of the present invention, digested polyethylene terephthalate provides the aromatic component. The polyethylene terephthalate to be digested can be any terephthalate plastic, plastic scrap, or bottoms formed during the formation of polyethylene terephthalate. Also, as used herein, the term "polyethylene terephthalate" includes not only homopolymers, but also copolymers in which minor amounts of other monomers; such as isophthalates or cyclic aliphatic diols, are included.

A commercially available mixture of succinic, glutaric, and adipic acid esters is the aliphatic component. The preferred glycols are diethylene glycol, triethylene glycol, tetraethylene glycol, and dipropylene or propylene glycol. The particular glycols used will determine some of the properties of the resultant polyol and/or foam. For example, the use of some polyethylene glycols increases CFC-11 miscibility and reaction speed, while the use of ethylene glycol and diethylene glycol will reduce CFC-11 miscibility while increasing the reaction speed.

As to proportions, the mole ratios of the various components should be as follows:

(a) glycols to aromatic plus aliphatic component in the range of 1.3 to 2:1; preferably 1.5 to 1.6:1;
(b) aromatic component to aliphatic component in the range of 0.6 to 4.0:1; preferably 1.0 to 2.5:1;
(c) a secondary to primary hydroxyl glycol of from 0.05 to 0.4:1; preferably 0.1 to 0.4:1; and
(d) ethylene glycol content to aromatic component of from about 0.01 to 0.5:1.0; preferably 0.06 to 0.4:1.0.

With the instant invention, it is possible that glycols may be removed in a partial polycondensation reaction, thus all examples and claims show the final mole ratios of the finished product. If no glycols are removed, the initial charged ratio would remain the final ratio.

The transesterification reaction of the mixed dimethyl esters with the mixed glycols, as well as the polycondensation reaction, if any, takes place between 130° C. and 250° C., preferably between 160° C. and 220° C., with the use of a suitable transesterification catalyst such as tetrabutyltitanate, dibutyl tin oxide, potassium methoxide, or oxides of zinc, lead or antimony used in the amount of 0.1% to 0.5% of the total mixture. The reaction of laboratory amounts takes from 4 to 6 hours with methanol being removed to drive the otherwise equilibrium reaction to completion. At least 95%, and preferably 100%, of the available methanol is removed by distillation. If a polycondensation reaction is to be included, the amount and composition of glycols removed must be monitored closely to ensure desired ratios are obtained. In the preferred embodiment, an excess of diethylene glycol (DEG) is added to affect rapid digestion of polyethylene terephthalate (PET), followed by a polycondensation reaction removing over 50% of the EG present and the excess amount of DEG added.

After the instant copolyester polyol resin is made, a polyol blend can be prepared comprising from 30 percent up to 90 percent by weight of the resin.

A polyurethane modified polyisocyanurate low density foam is formed by admixing the polyol blend with conventional catalysts, a blowing agent, any commercially available isocyanates, and, optionally, a surfactant.

As to the catalysts, one can use any conventionally used in producing polyurethane modified polyisocyanurate low density foams such as a quaternary ammonium organo salt catalyst for both the -OH to -NCO reaction and the trimerization of isocyanate groups, or else a tertiary amine catalyst in combination with an alkali metal carboxylate catalyst for both reactions.

Any alkali metal carboxylate can be employed such as sodium or lithium octoate, lithium stearate, or sodium caprioate; with the preferred metal being potassium used with acetate, adipate, butyrate, decanoate, isobutyrate, nonate, and stearate; with the most preferred form being potassium 2-ethylhexoate, also known as potassium octoate. The preferred version of potassium octoate is one which has at least 14% potassium. One such product is "Potassium HexCem, Code 977", as sold by Mooney Chemical Company. Other suppliers include Pelron Corporation and Jim Walter Resource Company.

In conjunction with an alkali metal carboxylate catalyst, some form of an amine catalyst must be used. Common tertiary amine catalysts used in conjunction with alkali metal carboxylate catalysts include N,N-dimethylcyclohexylamine, N,N-dimethylbenzyl amine, tetramethylethylene diamine, tetramethyl propane diamine, triethylene diamine, N,N-dimethylethanolamine, and 2,4,6 tris(dimethylaminomethyl) phenol, which is the preferred tertiary amine. This tertiary amino phenol is sold by Rohm and Haas Co. under the name "DMP-30", and by Pelron Corporation as "Pelron 9529".

Other trimerization catalysts can be used in place of, or in conjunction with, the preferred catalysts. For example, certain amine salts, preferably quaternary ammonium compounds, such as the N-hydroxypropyl trimethyl ammonium salt of formic acid can be used advantageously as a replacement for all, or part, of the catalysts of the preferred compositions. Such quaternary ammonium salts can be obtained under the trade name "DABCO TMR" or "DABCO TMR-2" from Air Products & Chemicals Company. It has been found that the total weight percent of potassium 2-ethylhexoate plus the tertiary amino phenol can be used as a good starting point for the weight percent addition rate of the quaternary amine salt catalysts. The total catalyst level usually comprises from 0.1 to 4.0, and preferably comprises from 0.7 to 3.0, weight percent of the composition.

With respect to surfactants, any commercial grade of polydimethylsiloxane-polyoxyalkylene block copolymer, such as Pelron "#9534" or "#9475" from Pelron Corporation, or "L-5420" and "L-5340" from Union Carbide Corporation, or "DC-193" from Dow Corning Corporation can be used. The surfactant generally comprises from 0.05 to 4, and preferably comprises from 0.1 to 2, weight percent of the composition.

The blowing agent can be any commonly employed in similar prior art foam products. These include water (for $CO_2$ blowing), methylene chloride, and chlorofluorocarbons such as $C-Cl_2F-C-ClF_2$, $C-Cl_2F-CF_3$, $C-Cl_2F_2$, and fluorotrichloromethane, $C-Cl_3F$, (CFC-11), which is the preferred blowing agent. The blowing agents are employed in an amount sufficient to produce the desired foam density which is generally between 0.5 and 10, and preferably between 1 and 5 pounds per cubic foot. The CFC type blowing agents generally comprise from 1 to 30, and preferably comprise from 5 to 20, weight percent of the composition.

Any commercially available isocyanates can be employed within the broadest aspect of the present invention. The preferred versions are polymethylene polyphenylisocyanates, and are those with a fuctionality between 2.1 and 3.2, and most preferable are those between 2.5 and 3.2 functionality. The preferred PMDI's are those with the above preferred functionalities and also have an equivalent weight between 130 and 145. These products tend to produce viscosities in the range of 250 to 2500 cps (at 25° C.), and are practical for commercial use within the scope of this invention.

The present invention is not to be limited to the foregoing examples of isocyanates, surfactants, catalysts, blowing agents, or fire retardants, as a large number of products are available and compatible with the polyols of the present invention for use in polyol blends and polyurethane modified polyisocyanurate foam manufacture. These products may be substituted by one skilled in the art after reading this specification and are deemed to fall within the teachings of the present invention.

A novel and essential aspect of the present invention when the preferred aromatic component used is the digested polyethylene terephthalate is the removal of at least the majority of ethylene glycol therefrom; which glycol is formed during digestion. Such removal is preferably effected by conventional vacuum distillation to remove from at least 50% to 90% of the ethylene glycol formed during digestion.

The digestion of the polyethylene terephthalate is carried out using at least one diol having a boiling point higher than ethylene glycol in the presence of a transesterification catalyst. Most suitable as the diol used is diethylene glycol and it is preferably used in an amount in excess of that required for digestion. Tetra-N-butyltitanate is the preferred catalyst. The digestion temperature is that conventionally used; preferably above 200° C., and the reaction is carried out at such temperature until the polyethylene terephthalate has disassociated and the desired aromatic (terephthalate) core units are obtained. The removal of ethylene glycol, as by vacuum distillation, also acts to remove a portion of the diol used to digest.

The thus-formed digested polyethylene terephthalate is uniquely suited to form the polyester polyols of the present invention. Removal of the majority of the ethylene glycol concurrently reduces the hydroxyl number of the polyol thus saving cost by reducing PMDI usage; reduces viscosity of the polyol thus making mixing, spreading, and pumping of the reactants easier to accomplish; and also reduces the hydrogen content of the polyol resulting in better fire resistance of the resultant foam. Also, such polyester polyols permit formation of foams from reactants having an NCO/OH index of greater than 3.

The invention will be further described in connection with the following examples which are set forth for purposes of illustration only.

EXAMPLE 1

The components used were charged into a 2 liter resin reaction kettle equipped with a heating mantle, mixer, nitrogen sparge, temperature indicating probe, and a 3-way distilling head down-leg adapter mounted on a 100 mm straight open tube adapter in the kettle lid, which down-leg arm was fitted with a cooled condenser, vacuum fitted elbow and a tared collector in ice. The kettle was charged with 576 grams of PET plastic scrap, 689 grams of diethylene glycol, and 2.0 grams of tetra-N-butyltitanate (TBT) catalyst. The mixture temperature was raised to 230° C. with slow agitation until all the PET had disassociated. This mixture was subjected to slowly increasing levels of vacuum to remove 67% of the ethylene glycol formed during digestion, and 21.5% of the DEG added. The distillate was monitored both by GC analysis and gravimetrically until the desired amounts of ethylene glycol and diethylene glycol were removed.

To the mixture remaining in the kettle was added 320 grams of a commercial blend of the dimethyl esters of succinic, glutaric, and adipic acids, 45.6 grams of propylene glycol, 200 grams of polyethylene glycol 200, and 1.0 gram of TBT catalyst. The kettle overhead was changed from the 100 mm open adapter to a 400 mm Hempel column packed with glass rings. This was topped by the same 3-way down-leg adapter, the cooled condenser and vacuum apparatus as before. The methanol was distilled away at 64°–66° C. while the transesterification reaction proceeded in the kettle from 160° C. to 220° C. At 220° C. the kettle temperature was held constant while 2 to 8 inches of vacuum were applied and the nitrogen sparge increased. After one hour, all the methanol was removed. The copolyester resin left in the kettle was tested and analyzed, and the composition and properties are shown as Example 1 in Table I. When a commercial blend of succinic, glutaric, and adipic acids is used in place of the dimethyl ester blend, it can also be added after the partial polycondensation reaction, as taught above; however, the polyol may need to be filtered after cooling and time is allowed for salt crystal formation. The transesterification, or esterification, reactions can be done prior to the partial polycondensation, but if PG is used it must be added after the last phase, and the process takes more time.

A polyol blend for this example can be made with the following formula:

| Component | Pbw |
| --- | --- |
| 1. Polyester Polyol | 65.0 |
| 2. Polyether Polyol (Poly G75-250: Olin Chem.) | 20.0 |
| 3. Fire Retardant (Fyrol PCF: Stauffer Chem.) | 15.0 |
| | 100.0 |

A foam for this example can be made with the following formula:

| Component | Pbw |
| --- | --- |
| 1. Polyol blend (above) | 65.0 |
| 2. Silicone surfactant | 2.5 |
| 3. Potassium Octoate | 2.5 |
| 4. Tertiary Amino Phenol | 1.0 |
| 5. CFC-11A | 28.0 |
| B Blend Total: | 99.0 |
| 6. PMDI | 110.0 |

Some properties of this foam are:

| | |
| --- | --- |
| Cream Time: | 6 seconds |
| Gel (2nd rise): | 37 seconds |
| Firm Time: | 46 seconds |
| Full Rise: | 55 seconds |
| Friability: | Acceptable |
| Cell Size/Shape: | Acceptable |
| Dimensional Stability: | Acceptable |
| Proprietary Pyrolysis Indication: | Class 1 |

EXAMPLE 2

The same apparatus was used as in Example 1 at the transesterification stage. Into the 2 liter kettle was charged 523.8 grams of DMT, 368.0 grams of the mixed aliphatic dimethyl esters, 60.8 grams of propylene glycol, 636.0 grams of diethylene glycol, 45.0 grams of triethylene glycol, 98.0 grams of tetraethylene glycol, and 3.0 grams of TBT. This mixture was reacted between 160° C. and 220° C. to remove all methanol as in Example 1. The copolyester resin had the composition and properties shown in Table I as Example 2.

It is possible to add the aliphatic acid blend in place of the aliphatic dimethyl esters along with DMT and glycols to remove both water and methanol simultaneously. Likewise, terephthalic acid or phthalic anhydride can be added along with either the aliphatic acids or their dimethyl esters to effect a one-stage process, thus reducing time.

A polyol blend for this example can be made with the following formula:

| Component | Pbw |
|---|---|
| 1. Polyester Polyol | 70.0 |
| 2. Pluracol 975 | 20.0 |
| 3. Pelron 9338 | 10.0 |
| | 100.0 |

A foam for this example can be made with the following formula:

| Component | Pbw |
|---|---|
| 1. Polyol blend (above) | 67.0 |
| 2. Silicone surfactant | 2.0 |
| 3. Potassium Octoate | 2.1 |
| 4. Tertiary Amino Phenol | .9 |
| 5. CFC-11A | 28.0 |
| B Blend Total: | 100.0 |
| 6. PMDI | 115.0 |

Some properties of this foam are:

| | |
|---|---|
| Cream Time: | 8 seconds |
| Gel (2nd rise): | 32 seconds |
| Firm Time: | 42 seconds |
| Full Rise: | 51 seconds |
| Friability: | Acceptable |
| Cell Size/Shape: | Acceptable |
| Dimensional Stability: | Acceptable |
| Proprietary Pyrolysis Indication: | Class 1 |

EXAMPLES 3–7

Examples 3 through 7 were all prepared in like manner utilizing the procedures of Examples 1 and 2, with varying mole ratios of reaction products. A "control" example without a secondary hydroxyl glycol being present is shown to illustrate the lower level of CFC-11 compatibility when no methyl pendant group is present. Since the percent by weight miscibility of CFC-11 in a polyester polyol can also vary with temperature, viscosity, and mixing procedure as well as with composition, accuracy to the nearest 5% by weight adequately represents the important differences demonstrated in Table I. Table II shows other possible polyol blends using various polyester examples, all being suitable for foam formulations similar to Examples 1 and 2 and all making acceptable foam products.

TABLE I

| Composition and Properties | (No PG) Control | EXAMPLES | | | | | | |
|---|---|---|---|---|---|---|---|---|
| | | 1 | 2 | 3 | 4 | 5 | 6 | 7 |
| Aromatic Core Units, Mols | 3.0 | 3.0 | 2.7 | 2.5 | 2.8 | 2.7 | 2.6 | 3.2 |
| Aliphatic Core Units, Mols | 2.0 | 2.0 | 2.3 | 2.5 | 2.2 | 2.3 | 2.4 | 1.8 |
| Propylene Glycol, Mols | — | .6 | .8 | 1.0 | — | 2.0 | 2.2 | — |
| Dipropylene Gycol, Mds | — | — | — | — | 1.3 | — | — | 2.0 |
| Diethylene Glycol, Mols | 5.3 | 5.1 | 6.0 | 4.7 | 4.3 | 4.7 | 4.3 | 4.3 |
| Ethylene Glycol, Mols | 1.6 | 1.0 | — | 1.0 | 1.0 | — | — | 0.5 |
| Triethylene Glycol, Mols | — | — | .3 | — | — | .3 | — | 0.3 |
| Tetraethylene Glycol, Mols | — | — | .5 | — | — | .5 | — | 0.5 |
| Polyethylene 200 Glycol, Mols | 1.0 | 1.0 | — | 1.0 | 1.0 | — | 1.3 | — |
| Viscosity, Brookfield, cps at 25° C. | 8650 | 8000 | 7900 | 4950 | 6100 | 8700 | 5200 | 6300 |
| Hydroxyl Number | 228 | 230 | 205 | 217 | 204 | 218 | 220 | 210 |
| CFC-11 Miscibility, weight percent, to nearest 5% max. | 5 | 10 | 10 | 15 | 20 | 20 | 25 | 30 |

TABLE II

| COMPONENT | BLEND NUMBER - PARTS BY WT. (Pbw) | | | | | | |
|---|---|---|---|---|---|---|---|
| | 1 | 2 | 3 | 4 | 5 | 6 | 7 |
| Polyester Polyol | 30 | 45 | 60 | 70 | 75 | 80 | 90 |
| Polyether Polyol (Poly G 75-250) | | | | | | 15 | 10 |
| Polyether Polyol (Poly G 75-350) | | | 30 | 20 | | | |
| Polyether Polyol (Pluracol 975: BASF-Wyandotte) | 60 | 45 | | | | | |
| Fire Retardant (Fyrol PCF) | 10 | 10 | 10 | | | | |
| Fire Retardant (Pelron 9338: Pelron Corp.) | | | | 10 | 10 | 10 | 10 |

The present invention also comtemplates a flexible foam and urethane-type elastomer in which the iscoyanate used is primarily a difunctional isocyanate. The complete details of such are not presently understood, but it is presently theorized that they will utilize the instant copolyester polyols in possibly different ratios of components. The instant copolyester polyol also have the capability of performing as lubricants and adhesives, again necessitating possibly, different ratios of components.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A hydroxyl terminated copolyester polyol resin having a functionality of about 2, comprising the reaction product of:
   A. an aromatic component selected from phthalic anhydride; phthalic acid isomers; phthalic acid halide isomers; di-lower alkanol esters of phthalic acid isomers; digestion products of polyethylene terephthalate; or mixtures thereof;
   B. at least one aliphatic component selected from succinic anhydride; succinic, glutaric, or adipic acids; di-lower alkanol esters of succinic, glutaric, or adipic acids; acid halides of succinic, glutaric, or adipic acids; or mixtures thereof; and
   C. at least one primary hydroxyl glycol; and
   D. at least one secondary hydroxyl glycol; the mole ratios of the components being:

(1) glycols to aromatic plus aliphatic component of from about 1.3 to 2:1;

(2) aromatic component to aliphatic component of from about 0.6 to 4.0:1;

(3) a secondary to primary hydroxyl glycol of from 0.05 to 0.4:1, where all mole ratios represent the final mole ratios inasmuch as glycols may be removed during processing; and (4) ethylene glycol content to aromatic component of from about 0.01 to 0.5:1.0 when a digestion product of polyethylene terephthalate is used as the aromatic component.

2. The copolyester polyol resin of claim 1 wherein the aromatic component is a digestion product of polyethylene terephthalate obtained by digesting polyethylene terephthalate in at least one diol having a boiling point higher than ethylene glycol in the presence of a transesterification catalyst and removing therefrom at least 50% of the ethylene glycol formed during digestion.

3. The copolyester polyol resin of claim 1 wherein the aliphatic component is a blend of succinic, glutaric, and adipic acids, or the di-lower alkanol esters of succinic, glutaric, and adipic acids.

4. The copolyester polyol resin of claim 1 wherein the primary hydroxyl glycol component is selected from ethylene glycol, diethylene glycol, triethylene glycol, tetraethylene glycol, pentaethylene glycol, and polyethylene glycol 200, or mixtures thereof.

5. The copolyester polyol resin of claim 1 wherein the secondary hydroxyl glycol is selected from propylene glycol, dipropylene glycol, tripropylene glycol, or mixtures thereof.

6. The copolyester polyol resin of claim 1, 2, 3, 4, or 5 wherein the finished mole ratios of the components are:

(a) glycols to aromatic plus aliphatic components of about 1.5 to 1.6:1;

(b) aromatic component to aliphatic component of about 1.0 to 2.5:1;

(c) secondary to primary hydroxyl glycol of about 0.1 to 0.4:1; and (d) ethylene glycol content to aromatic component of from about 0.06 to 0.4:1.0.

7. The copolyester polyol resin of claim 1, 2, 3, 4, or 5 wherein the hydroxyl number of the polyol is between 175 and 275.

8. The copolyester polyol resin of claim 1, 2, 3, 4, or 5 wherein the Brookfield viscosity is below 10,000 centipoise at 25° C.

9. The method of preparing a copolyester polyol resin of claim 1, 2, 3, 4, or 5 comprising digesting polyethylene terephthalate in at least one diol having a boiling point higher than ethylene glycol in the presence of a transesterification catalyst at a temperature and for a time sufficient to digest said terephthalate, removing therefrom at least 50% of the ethylene glycol formed during digestion, and admixing the remainder of said digestion product with:

A. at least one aliphatic component selected from succinic anhydride; succinic, glutaric, or adipic acids; di-lower alkanol esters of succinic, glutaric, or adipic acids; acid halides of succinic, glutaric, or adipic acids; or mixtures thereof; and B. at least one primary hydroxyl glycol; and C. at least one secondary hydroxyl glycol; the mole ratios of the components being:

(1) glycols to aromatic plus aliphatic component of from about 1.3 to 2:1;

(2) aromatic component to aliphatic component of from about 0.6 to 4.0:1;

(3) a secondary to primary hydroxyl glycol of from 0.05 to 0.4:1, where all mole ratios represent the final mole ratios inasmuch as glycols may be removed during processing; and (4) ethylene glycol content to aromatic component of from about 0.01 to 0.5:1.0.

10. A polyol blend comprising:

A. from about 30 percent up to about 90 percent by weight of a hydroxyl terminated copolyester polyol resin of claim 1, 2, 3, 4, or 5; and B. from about 10 percent up to about 70 percent by weight of any materials or blends of materials which are mutually compatible with blowing agents and said polyester polyols and capable of providing sufficient urethane cross-linking functionalities or sufficient isocyanate trimerization to produce dimensionally stable foams.

11. The polyol blend of claim 10 wherein the hydroxyl terminated copolyester polyol resin comprises:

(a) the aromatic component of claim 2;

(b) the aliphatic component of claim 3;

(c) the primary glycol of claim 4;

(d) the secondary glycol of claim 5;

(e) the respective mole ratios of claim 6;

(f) the hydroxyl number of claim 7; and (g) the viscosity of claim 8.

12. A polyurethane modified polyisocyanurate low density foam comprising the reaction product of:

(a) polymeric polymethylene polyphenylisocyanate;

(b) the polyol blend of claim 10 or 11;

(c) catalysts suitable for preparing a polyurethane and polyisocyanurate foam;

(d) a blowing agent suitable for preparing a polyurethane modified polyisocyanurate low density foam; and, optionally, (e) a silicone surfactant suitable for controlling foam cell size and shape.

13. A polyurethane modified polyisocyanurate foam of claim 12 wherein the catalyst is a quaternary ammonium organo salt catalyst for both the -OH to -NCO reaction and the trimerization of isocyanate groups, or else a tertiary amine catalyst in combination with an alkali metal carboxylate catalyst for both reactions; and the surfactant used is a polydimethylsiloxanepolyoxyalkylene block copolymer.

14. A polyurethane modified polyisocyanurate low density foam of claim 12 or 13 wherein the density is between 0.5 and 10.0 pounds per cubic foot, and is most preferably between 1.0 and 5.0 pounds per cubic foot.

15. A digested polyethylene terephthalate consisting essentially of terephthalic core units, at least one diol having a boiling point higher than EG, and ethylene glycol, the final ethylene glycol content being less than 50% of the amount originally formed during digestion.

16. The method of making the digested polyethylene terephthalate of claim 15 comprising heating a polyethylene terephthalate in an excess amount of at least one diol having a boiling point higher than ethylene glycol in the presence of a transesterification catalyst at a temperature and for a time sufficient to digest the polyethylene terephthalate and then removing therefrom at least 50% of the ethylene glycol formed during digestion.

* * * * *